United States Patent [19]

Lesslhumer

[11] 4,356,687
[45] Nov. 2, 1982

[54] LOADING EQUIPMENT FOR AGRICULTURAL BULK GOODS

[75] Inventor: Josef Lesslhumer, Wels, Austria

[73] Assignee: Johann Wolf G.m.b.H., Austria

[21] Appl. No.: 229,095

[22] Filed: Jan. 28, 1981

[30] Foreign Application Priority Data

Feb. 14, 1980 [AT] Austria ................................. 778/80

[51] Int. Cl.³ .............................................. A01D 43/02
[52] U.S. Cl. ..................................... 56/364; 198/518
[58] Field of Search .............. 198/510, 511, 518, 519; 414/502; 56/364

[56] References Cited

U.S. PATENT DOCUMENTS

| | | | |
|---|---|---|---|
| 1,723,462 | 8/1929 | Boettcher | 56/364 X |
| 1,810,389 | 6/1931 | Boettcher | 198/518 X |
| 2,328,278 | 8/1943 | Innes | 56/364 |
| 3,745,754 | 7/1973 | Gronberg | 56/364 X |

FOREIGN PATENT DOCUMENTS 450794  4/1968  Switzerland .

*Primary Examiner*—John J. Love
*Assistant Examiner*—Douglas D. Watts
*Attorney, Agent, or Firm*—James E. Nilles

[57] ABSTRACT

Loading equipment comprising a pick-up mechanism for picking up agricultural bulk material such as grass or hay, and having a conveying channel adjoining the take-up mechanism, and a conveyor having a conveying drum which rotates about a transverse axis is disclosed. At its periphery the drum is provided with feed combs having prongs that are pivotable about an axis, the feed prongs of the combs extending into the conveying channel and being controlled during rotation such that during conveying, each feed comb is moved by a crank arm into a radial position and during movement outside the conveying channel it is moved into a folded position. The conveying drum drive and control assembly are designed so that the drum, while compact in design, can be adapted to many different operating conditions without any major constructional changes in that the axis of the conveying drum is stationary and the axis carries within the drum at least one eccentric disc on which a control ring is rotatably supported which is provided with a coupling connected to the conveying drum, and actuating arms which are each articulated at one end to the control ring and at the other end to the associated crank arm.

16 Claims, 12 Drawing Figures

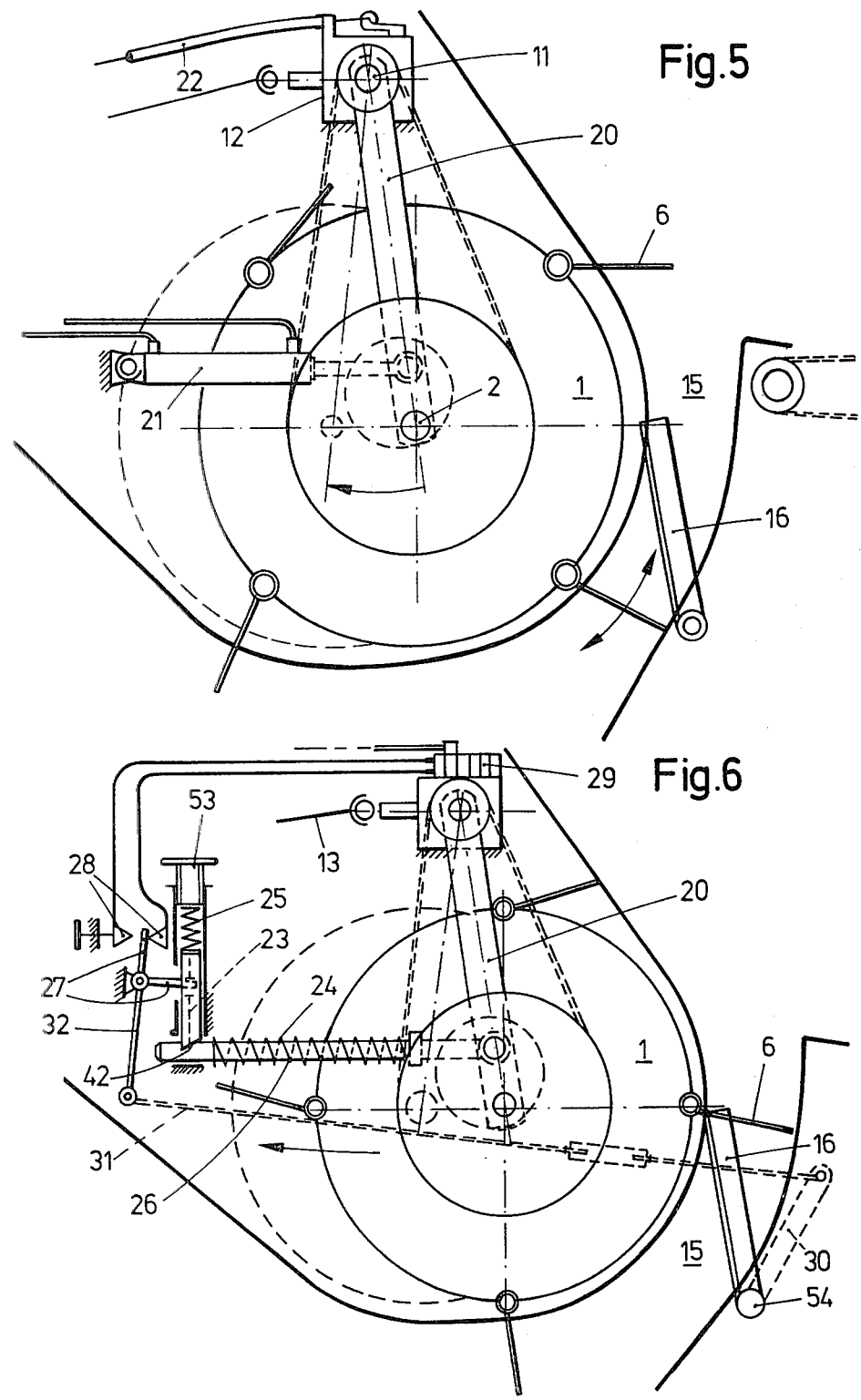

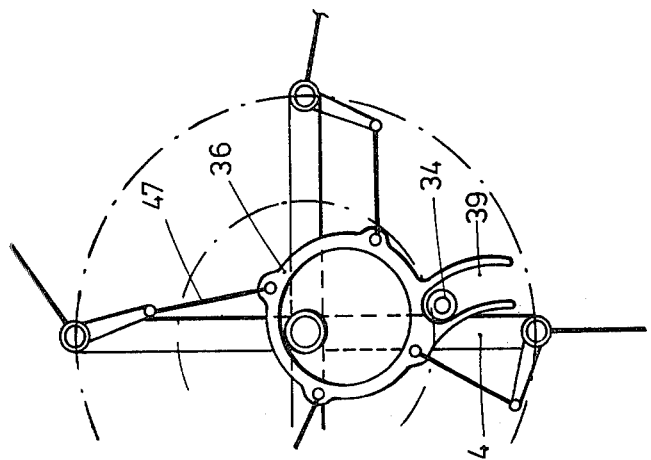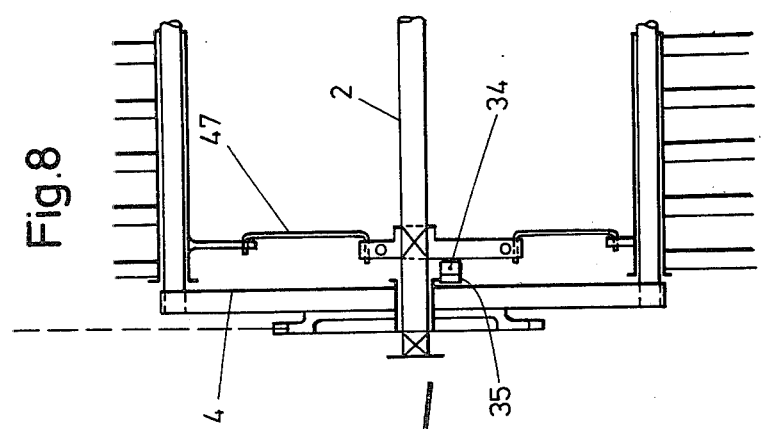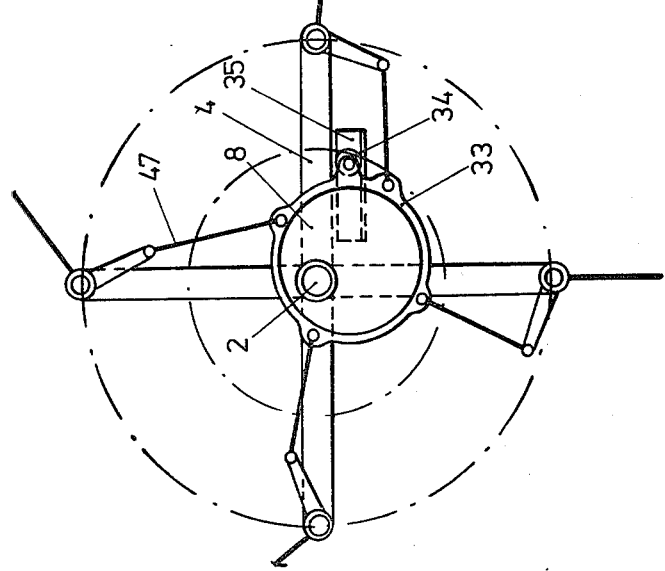

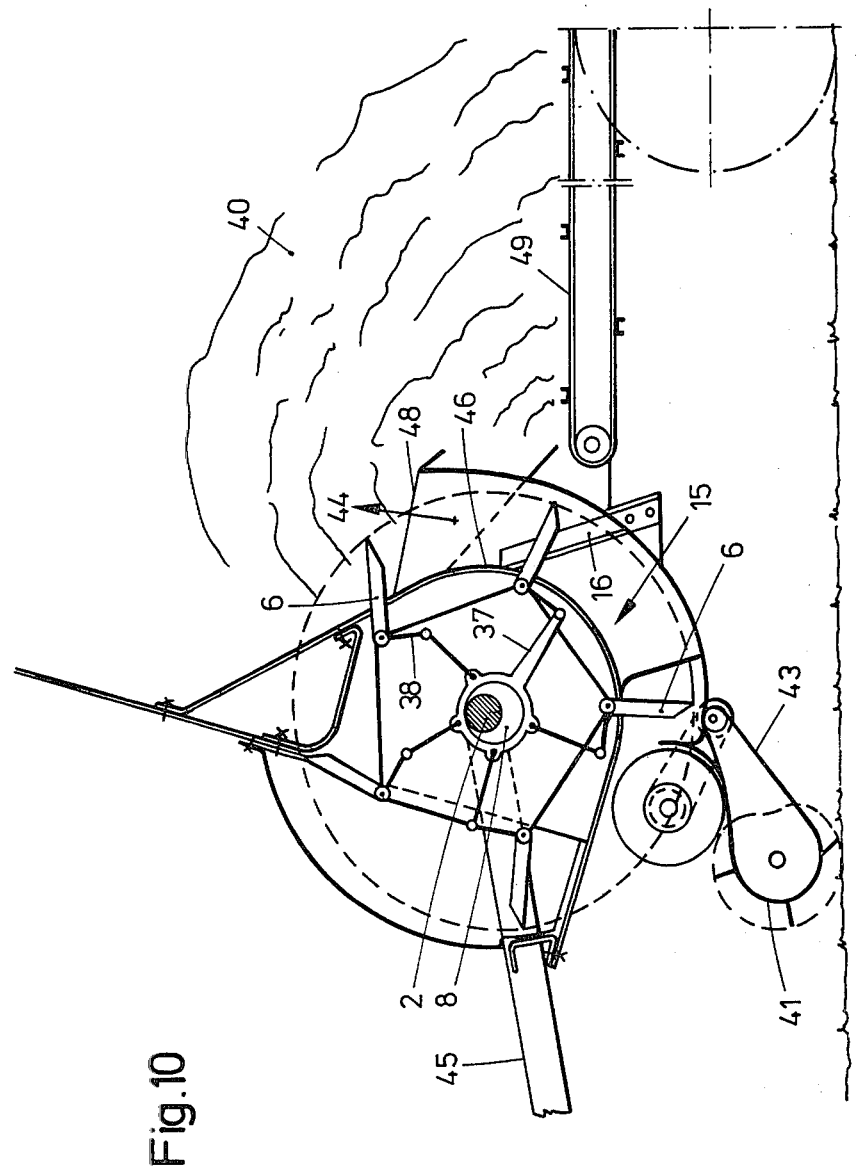

LOADING EQUIPMENT FOR AGRICULTURAL BULK GOODS

BACKGROUND OF THE INVENTION

The invention relates generally to loading equipment comprising a pick-up or take-up means for taking up agricultural bulk material such as grass or hay from the ground over which it moves.

As shown in the Swiss Pat. No. 450,794, it is known to provide conveying means having conveying drums wherein the control of its feed prongs is effected by slotted guide means disposed outside the conveying drum and in front of the end faces thereof, which results not only in a considerable space requirement, but also in that the position of the conveying drum relative to the drive cannot be changed and its control function is very difficult to change and, still further, in that the drum length, for instance, cannot be dimensioned at random. Nor is it possible to adjust the inclination of the feed prongs or the depth of extension thereof into the conveying channel. During the pushing in of the material to be loaded and, in particular, during the cutting thereof, the feed combs are subjected to heavy torsional stresses and therefore have to be of appropriate strength, as the laterally disposed crank arms must be spaced from each other a distance corresponding to the length of the drum. Besides, the straight slotted guide means and the rolls of the crank arms which are guided therein are subject to heavy wear and permit a low speed of rotation only.

SUMMARY OF THE PRESENT INVENTION

The object underlying the invention is to design the drive and control assemblies for the conveying drum of a loading equipment of this type such that the conveying drum, while being compact in design, can be adapted to all different kinds of functional requirements without any major constructional expenditure.

This object is accomplished according to the invention in that in a loading equipment of this type the axis of the conveying drum is stationary and carries within the drum at least one eccentric disc which is provided with a coupling means connected to the conveying drum, and actuating arms which are each articulated at one end thereof to the control ring and at the other end thereof to the associated crank arm.

Owing to the fact that the entire control system is arranged within the conveying drum it may be located, for instance, in the middle of the length of the conveying drum or two control assemblies can be provided at points spaced from each other by ⅓ of the drum length, whereby the torsional stresses acting on the feed combs will be substantially reduced. As there are normally provided from four to six feed combs over the circumference of the conveying drum, the prongs of two or three feed combs engage the material being loaded at a time, with the associated feed combs being backed up by their control organs such that major load peaks like those occurring during cutting are jointly taken up by these feed combs. Thereby it is also possible to adjust the inclination of the feed elements in the conveying channel while the conveying drum is rotating. The fact that the entire control system is accommodated within the drum affords the further advantage of the conveying drum together with the control system being adapted to be supported in a displaceable manner.

In an embodiment which is particularly suitable for realization of this possibility, the conveying drum has associated thereto a connecting gear shaft which extends parallel to the axis of the conveying drum and which serves as a pivot axis for the conveying drum in that pivot arms connected to the transmission gear shaft extend from both ends of the axis of the conveying drum outside the latter.

In an embodiment which does not involve any major extra expenditure, the transmission gear shaft may be divided in two parts with a reversing gear connected therebetween, so that when the channel gets clogged the obstruction can be removed by simply pivoting the conveying drum away from the channel while reversing the drive at the same time. Furthermore, in this embodiment, the depth of extension of the feed prongs into the conveying channel can be varied such that the prongs extend less far into the conveying channel, as in case of peak loads, or that the feed prongs are disengaged from the material being loaded, as in case of some strange matter being taken up.

The coupling means of the conveying drum can be particularly simple in design, if constructed as an arm which extends rigidly from the control ring and which is hingedly connected to a crank arm.

Alternatively, the coupling means may be in the form of an approximately radially extending slotted guide means and a coupling roll in engagement therewith.

Owing to the fact that each control ring is supported on a circular eccentric disc it is possible for each control ring to be supported on the respective eccentric disc by means of annular ball bearing.

The conveying drum can be adapted to special operating conditions in the form of heavy load operating conditions in a simple manner in that the conveying drum is divided into at least two longitudinal sections, with the feed combs of the individual sections being circumferentially offset relative to each other and each longitudinal section having an eccentric disc mounted approximately in the middle of the longitudinal extension of the section and the control rings which cooperate with the eccentric discs being arranged such that the ends of the feed prongs of all sections describe approximately equal paths of travel.

By this design of the conveying drum the cutting work is distributed to smaller zones, whereby a considerable decrease in the load peaks is obtained. For example, if the drum is divided into three sections each carrying four feed combs, twelve sequential cuts are carried out during one revolution of the conveying drum. While with the prior art external control systems the conveying drum could only be divided into two sections, the invention permits the drum to be divided into any number of sections desired.

Further features of the invention can be noted from the subclaims.

Following is a description of embodiments of the invention with reference to the drawings, in which FIG. 1 is a schematic sectional view of the conveying drum, FIG. 2 is a schematic side elevational view of the conveying means in a first embodiment, FIG. 3 is a schematic front elevational view of a conveying drum which is divided into 3 sections, FIG. 4 is a schematic side elevational view of the embodiment of FIG. 3, FIG. 5 is a side elevational view of the conveying drum with a hydraulic adjusting means, FIG. 6 is also a side elevational view of the conveying drum, provided with a further adjusting and locking means, FIG. 7 is a side elevational view of a further embodiment showing the conveying drum control system, FIG. 8 shows a partial longitudinal section through the conveying drum of FIG. 7, FIG. 9 is a side elevational view of a still further embodiment of the drum control system, FIG. 10 is a schematic side elevational view of the loading equipment including the conveying means, FIG. 11 is a schematic view showing a section through a still further embodiment of the conveying drum in the axial direction, FIG. 12 is a cross-sectional view of the conveying drum along line XII—XII of FIG. 11.

DESCRIPTION OF THE PREFERRED EMBODIMENT

Figure 1:
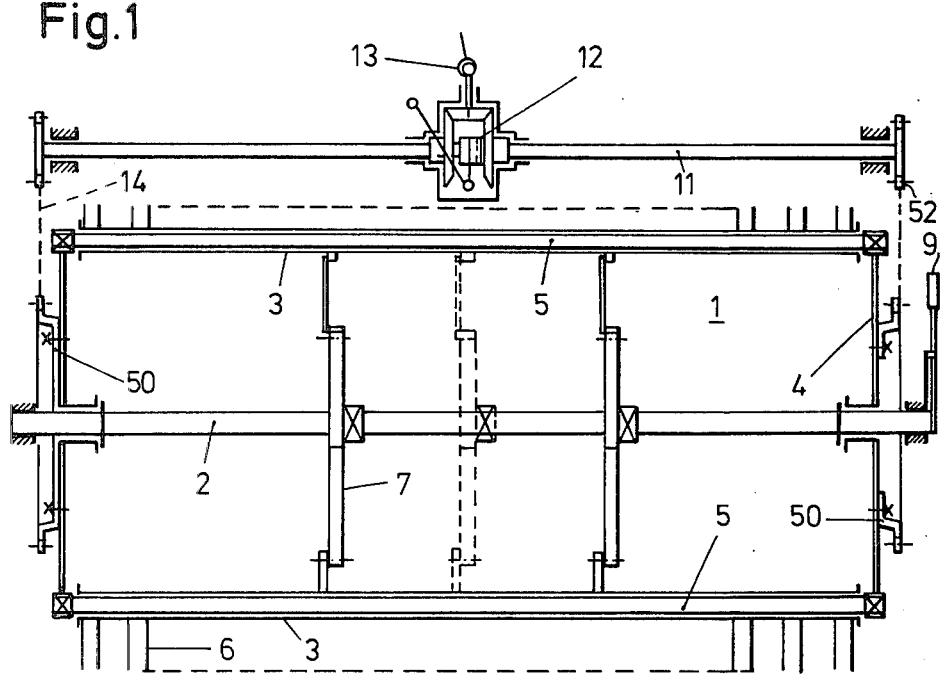

As can be seen from FIG. 10, the loading equipment comprises a take-up means 41 for taking up material from the ground, and a bottom plate 43 adjoining the take-up means for guiding the material that has been picked up to a conveying channel 15 which forms part of the conveying means. The material leaves the conveying channel at the upper mouth 44 from where it is heaved through the air onto a scraper flight conveyor 49.

Feed prongs 6 extend into the conveying channel through slots in the inner guide plates 46. In the illustrated embodiment, these feed prongs 6 cooperate with cutter blades 16 which extend into the conveying channel 15 from the opposite side thereof.

The loading equipment can be pulled by a pole or it can be of the self-propelled type.

As can be seen from FIG. 1, the conveying drum 1 is rotatably supported on a stationary axis 2. At the circumference of the conveying drum there are provided feed combs 3.

The conveying drum 1 is limited at the ends thereof by discs or crossbars 4 which are rotatably supported on the axis 2 and fixedly interconnected at the periphery by four bars 5. The feed combs which are of tubular configuration and have the feed prongs 6 mounted thereon are supported on the bars 5 so as to be pivotable to a limited extent. Each feed comb 3 has at least one crank arm 38 rigidly extending therefrom.

The axis 2 carries at least one eccentric disc 8 of circular outer configuration. On the annular circumferential surface of the eccentric disc 8 a control ring 7 is supported for rotation preferably by a ball bearing (not shown).

Figure 2:
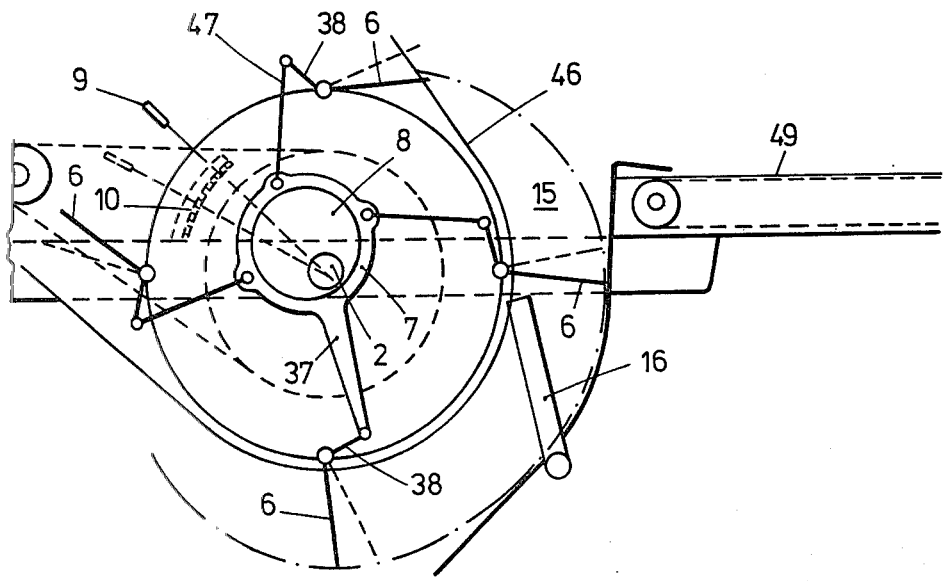

In the embodiment of FIG. 2, the control ring 7 is provided in a control arm 37 which rigidly extends therefrom approximately radially outwardly and which is connected at the end thereof to one of the crank arms 38 by means of a hinge means, such as a hinge bolt. The other crank arms 38 of the feed prongs 6 are each hinged at one end thereof to an actuating arm 47 respectively whose other end is connected by a pivot pin to the control ring 7.

In the embodiment of FIG. 1, two such eccentric control assemblies are provided at a distance from each other which approximately corresponds to ⅓ of the drum length and the eccentric discs 8 are fixedly connected to the axis 2.

The axis 2 can be angularly adjusted by means of an adjustment lever 9 adapted to be locked in various positions by means of a stationary notched segment 10. Thereby, adjustment of the feed prongs 6 can also be effected during rotation of the conveying drum 1. Such adjustment can be useful in order to change the pushing direction for better adjustment to the kind of fodder being loaded, and it is of importance in particular for loading equipments having front-side unloading means for providing troublefree delivery. (FIGS. 1 and 2). In the simplest case, a single control assembly in the form of the eccentric disc 8 and the control ring 7, as indicated in FIG. 1 by a dashed line in the middle of the drum 1 with respect to the length thereof, is sufficient for controlling the feed combs. There is no constructional limitation as to the number of such control assemblies, so that a plurality of such control assemblies may be accommodated within the drum just as well, if demanded by the load conditions. The axis 2 may have any cross-section desired and it may also be of tubular configuration.

The lateral crossbars 4 of the conveying drum have a sprocket wheel 50 rigidly connected thereto on the outwardly facing sides of the crossbars.

Above the conveying drum 1 a transmission gear shaft 11 extending parallel to the axis 2 is provided which is divided in the middle, with a reversing gear 12 driven by a power take-off 13 being connected between the two parts of the transmission gear shaft 11. Each end of the transmission gear shaft 11 carries a pinion 52 which is connected via a chain 14 to the sprocket wheel 50, thereby causing the conveying drum to rotate.

The cutter blades 16 which extend into the conveying channel 15 are arranged in rows and spaced from each other such that the cutter blades cooperate with the feed prongs 6, each cutter blade 16 being engaged by a feed prong 6 in the form of a two-legged prong.

As can be seen from FIG. 2, the feed prongs 6 are controlled by the above-described control assembly so that the feed prongs assume an appropriately radial position while pushing the material forward, especially through the conveying channel 15. Downstream of the end of the conveying channel with respect to the direction of drum rotation the feed prongs are folded to an almost tangential position to prevent them from pushing the material any farther and to make it possible to disengage them from the material without difficulty.

In the course of further circulation the feed prongs 6 are gradually returned to their radial positions.

Figure 3:
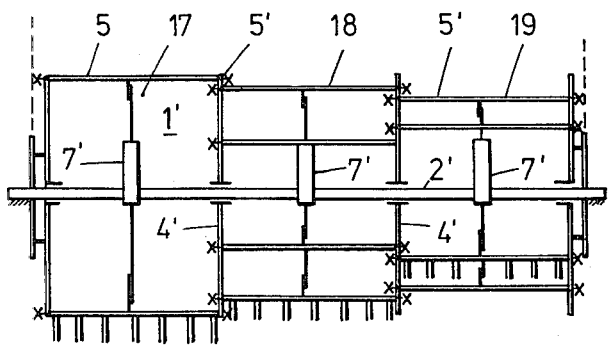
Figure 4:
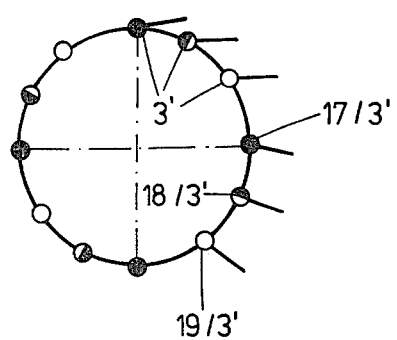

FIG. 3 is a schematic view of a conveying drum 1' which is divided into three sections and provided with prong carriers 3' which are circumferentially offset relative to each other. The schematic side elevational view of FIG. 4 shows the offset positions of the prong carriers. Each of the drum sections 17, 18 and 19 has a separate eccentric control assembly 7' located approximately in the middle of the section. The interposed crossbars 4' are supported on the axis 2' and together with the crossbars at the ends of the drum and the bars 5' which are fixedly connected to the end crossbars they define a torsion-resistant rotary body. Owing to the offset arrangement of the individual drum sections relative to each other, load peaks are decreased, which is of importance in particular in regard to cooperation with a multi-blade cutting mechanism. Still further, rotation of the conveying drum becomes particularly smooth thereby, so that by cooperation with the ball bearing type support of the control rings on the eccentric discs, an extremely smooth run protecting all constructional elements is ensured even at high operating speeds.

As can be seen from FIGS. 5 and 6, the conveying drum 1 can also be pivotally supported in consideration of the fact that the control assembly is located within the drum, so that the depth of extension of the feed prongs 6 into the conveying channel 15 is adjustable or controllable, respectively.

To this end, each end of the axis 2 is fixedly connected to a pivot arm 20. Each pivot arm is supported at the other end thereof for pivoting about the transmission gear shaft 11. At least one pivot arm is connected to a double admission type plunger of a hydraulic cylinder 21. The leads to the hydraulic cylinder 21 which are shown in FIG. 5 illustrate that the conveying drum 1 can also be adjusted from the driver's seat.

The reversing gear 12 can also be controlled from the driver's seat by means of a Bowden wire 22 or a linkage. Thereby it becomes possible to swing the conveying drum 1 away from the conveying channel 15, if the latter is clogged or some strange object has been picked up from the ground. As a result, the feed prongs 6 will extend less deeply, or not, into the conveying channel 15. Then the direction of rotation of the drum drive can be reversed and the conveying drum can be slowly returned to its starting position, whereby the obstructed conveying channel can be cleared or strange objects can be removed, respectively.

In another embodiment of this swing type version, the controlling of the conveying drum and the reversing gear can be effected automatically. This is illustrated by the embodiment shown in FIG. 6.

In this embodiment, an actuating rod 24 is connected by a joint to one pivot arm 20. The actuating rod 24 is provided adjacent the free end thereof with a sloping notch 42 which is engaged by a locking bar 23 acted upon by a pressure spring 25 which can be adjusted by means of a screw 53, when the feed prongs 6 fully extend into the conveying channel 15, i.e. when the conveying drum 1 is swung into the operative position. The locking bar 23 establishes a positive lock to prevent the conveying drum from being pivoted in this direction any farther. In regard to the pivoting of the conveying drum 1 away from the conveying channel, however, the locking bar 23 establishes a frictional lock only, i.e. it acts as a brake under the pressure of the spring 25. If the pressure in the conveying channel 15 exceeds a predetermined value which has been set on the locking bar 23 by means of the compression spring 25, the locking bar 23 is forced upwardly by the actuating rod 24. As a result, the conveying drum can swing back against the pressure of a return spring 26 which is provided on the actuating rod 24 and engages the flange on the rod.

When the conveying drum 1 is swung back, the locking bar 23 is forced upwardly. Thereby a knee lever 27 engaging the locking bar 23 is moved as well. The knee lever 27 is pivotally supported at the knee thereof by means of a stationary learing and the other leg of the knee lever operates a switch 28, whereby a clutch 29 is electromagnetically operated to reverse the sense of rotation of the gear 12.

When the resistance that had built up in the conveying channel has been removed, the conveying drum 1 is returned by the return spring 26 into the starting position and the locking bar 23 re-engages the sloping notch in the actuating rod 24.

Instead of being detained in the above-described force-locking manner, the actuating rod 24 can be detained by other conventional detaining means just as well, provided the detaining means has a load threshold such that once the threshold has been overcome the detaining means offers no, or only little, resistance.

In FIG. 6 the cutting blades 16 of one row of cutting blades are supported for pivoting about an axis 54. Rigidly connected to the pivot axis 54 is a lever arm 30 which is hingedly connected via a linkage 31 to an extension 32 of the knee lever 27. The cutting blades 16 are maintained in their cutting position by a spring (not shown). When a foreign object hits against the cutting blades in the conveying channel, the cutting blades 16 in the conveying channel can swing back a certain amount. Thereby the locking bar is caused via the lever arm 30, the linkage 31 and the knee lever 27 and 32 to move upwardly against the pressure of spring 25, whereby the actuating rod 24 becomes unlocked so that the conveying drum 1 can swing away from the conveying channel.

Alternatively, this embodiment can be designed to provide that by the limited pivoting movement of the cutter blades a hydraulic cylinder (21 in FIG. 5) is controlled and the electromagnetic means for changing the sense of rotation is actuated.

In a simple design, it is possible to provide that once a resistance threshold has been overcome, pivoting of the conveying drum and complete or partial retraction of the feed prongs is effected directly via a linkage, or the like, actuated by an appropriately adjustable movement of the cutting blades.

In the embodiment shown in FIGS. 7 and 8, the eccentric discs 8 are mounted on the stationary axis 2, like in the other embodiments, each eccentric disc carrying a control ring 33 in a rotatable manner. This control ring 33 comprises at least one rotatable guide roll 34 engaging a U-shaped link guide rail 35 which extends at an angle relative to the radial direction of the control ring. The link guide rail 35 is fixedly connected to a crossed arm assembly 4 of the conveying drum 1 so that it acts as a coupling means between the conveying drum 1 and the control ring 33. Thus, all actuating arms 47 can be hingedly connected to the control ring 33.

The embodiment shown in FIG. 9 comprises a coupling means which is basically of the same type. In this embodiment, however, the control ring 36 is provided with a fork-shaped link guide rail 39 which is engaged by a guide roll 34 rotatably supported on the drum cross 4. In this embodiment, too, all actuating arms 47 are hingedly connected to the control ring 36.

The pivotabiity and controllability of the conveying drum and, thus, the special function of the feed prongs can also be beneficially utilized for accomplishing dosing with unloading and delivering devices.

It is further noted that in the case of the multi-section conveying drums shown in FIGS. 3 and 4 the ends of the feed prongs of all sections of the conveying drum can describe approximately equal paths of travel.

Figure 11:
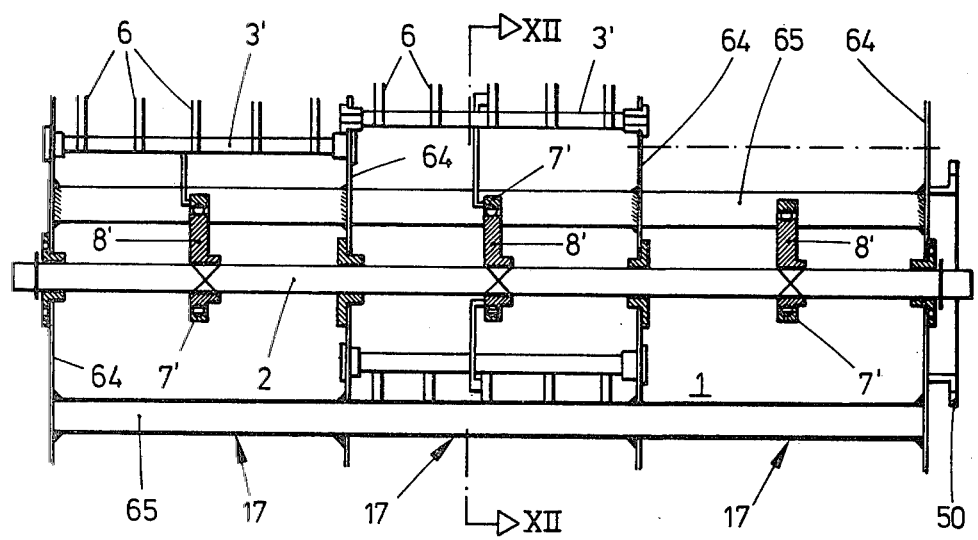
Figure 12:
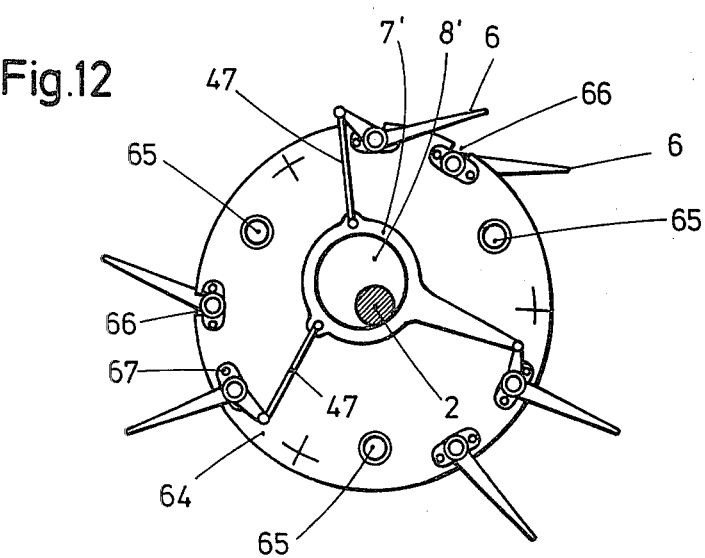

The conveying drum 1 shown in FIGS. 11 and 12 is identical in principle to the conveying drum according to FIG. 1 as regards the design of the control system. It consists of four drum discs 64 which are welded to full-length rods 65 having preferably tubular or profiled cross-sectional configurations to form a rigid drum. The rods 65 are not disposed at the peripheries of the drum discs 64, but are somewhat inwardly spaced therefrom. The conveying drum 1 comprises three drum sections 17. In each drum section 17, the associated drum discs 64 are provided adjacent the peripheries thereof with outwardly open recesses 66. Each of these recesses 66 accommodates a flanged bearing 67 which is inserted from the disc periphery and releasably fastened by means of bolts. The flanged bearings 67 are angularly offset from one drum section 17 to the next, as is shown in FIG. 12. Each pair of opposed flanged bearings 67 has a prong carrier 3' in the form of a bar or a tubular member pivotally supported therein, the prong carriers 3' being provided with prongs 6 to form feed combs.

Like in the embodiment of FIG. 3, the axis 2 of the conveying drum 1 has wedged thereon in each drum section 17 an eccentric disc 8' on which a control ring 7' is rotatably supported.

In this embodiment, each feed comb can, thus, be easily mounted and dismounted by simply removing the associated flanged bearings 67 from the drum discs 64 after releasing the connection of the actuating arms 47 and the control arms 37 with the prong carriers.

The conveying drum according to FIGS. 11 and 12 finds particular utility for multiple offsetting of the feed combs, as owing to the provision of the rigid rotary body it is possible to provide only a small number of rows of feed combs without detriment to the stability of the drum. In the illustrated embodiment, three rows of feed combs are provided, whereby the mechanical expenditure (bearings, etc.) is considerably reduced as well. The cutting sequence within a unit of time can be balanced vis-a-vis that of drums provided with five or six feed combs in that the speed of rotation of the conveying drum is increased, which is easily feasible by the control system provided.

At least the outer discs 64 have bearings bolted thereto at the disc centers. As shown in FIG. 11, it is possible for operating under heavy load conditions (multi-blade cutting mechanism) to provide all of the four discs with bearings for better support. In each drum section, three feed combs are supported at the peripheries of the discs, the combs of the individual drum sections being offset relative to each other. The feed combs can be in the form of shafts which are shouldered at both ends thereof respectively and which carry the feed prongs. In assembly, the feed combs are fitted into the discs in axially offset fashion and guided on both sides by flanged bearings adapted to be bolted on.

It should also be noted that the described device for controlling the feed prongs of conveying systems also find utility for controlling the prongs of tedding machines having a rotary frame rotating about a vertical axis and having rod-like support arms which extend approximately radially outwardly and are supported for pivoting about their longitudinal axes, with the prongs being arranged on the outer end of each support arm. In such type prior art tedders, a cam disc is mounted on the vertical rotary axis for rotation therewith, this cam disc controlling crank arms which are respective connected to the inner end of each support arm to effect pivoting of the support arms.

The pivoting of the support arms or the prongs mounted thereon, respectively, can now also be effected by means of the control system according to the invention.

I claim:

1. A loading equipment comprising a take-up means for taking up agricultural bulk material such as grass or hay, and further comprising a conveying channel adjoining said take-up means, and a conveying means having a conveying drum which rotates about an axis and which is provided at its circumference with feed combs which consist of feed prongs and which are each supported for pivoting about an axis, the feed prongs of said feed combs extending into said conveying channel and being controlled during circulation such that during feeding, each feed comb is moved by means of a crank arm into an approximately radial position and during circulation outside the conveying channel into a folded position, characterized in that said axis (2) of said conveying drum (1) is stationary and that inside said drum (1) said axis (2) carries at least one eccentric disc (8) on which a control ring (7 or 33 or 36, respectively) is rotatably supported which is provided with a coupling means connected to said conveying drum (1), and actuating arm (47) which are each articulated at one end thereof to said control ring (7) and at the other end thereof to the associated crank arm (38).

2. Loading equipment according to claim 1, characterized in that said coupling means is designed as an arm (37) which rigidly extends from said control ring (7) and is hingedly connected to a crank arm (38) (FIG. 2).

3. Loading equipment according to claim 1, characterized in that said coupling means consists of an approximately radially extending slotted guide means (35 or 39, respectively) and a coupling roller (34) engaging said slotted guide means (FIGS. 7 anmd 9).

4. Loading equipment according to claim 3, characterized in that said slotted guide means (39) is curved (FIG. 9).

5. Loading equipment according to claim 1, characterized in that each control ring (7 or 33 or 36, respectively) is supported on said eccentric disc (8) by means of an annular ball bearing.

6. Loading equipment according to claim 1, characterized in that said conveying drum (1) is divided into at least two longitudinal sections (17, 18, 19), the feed combs (6) of said longitudinal sections being circumferentially offset relative to each other and an eccentric disc being provided approximately in the middle of the longitudinal extension of each longitudinal section and said control rings (7'), which cooperate with said eccentric discs being arranged such that the ends of the feed prongs of all sections describe approximately identical paths (FIGS. 3 and 4).

7. Loading equipment according to claim 1, characterized in that said conveying drum (1) has associated thereto a transmission gear shaft (11) extending parallel to said axis (2) of said conveying drum (1) (FIG. 1).

8. Loading equipment according to claim 7, characterized in that said transmission gear shaft (11) serves as a pivot axis for said conveying drum (1) in that pivot arms (20) connected to said transmission gear shaft (11) extend from both ends of said axis (2) of said conveying drum (1) outside of said conveying drum (1) (FIGS. 5 and 6).

9. Loading equipment according to claim 8, characterized in that said transmission gear shaft (11) is divided and a reversing gear (12) is connected between said two shaft portions (FIG. 1).

10. Loading equipment according to claim 8, characterized in that at least one of said pivot arms (20) is acted upon by an actuating means (21) for pivoting said conveying drum (1) into said conveying channel (15) of (FIG. 5).

11. Loading equipment according to claim 10, characterized in that said actuating means is in the form of a pretensioned spring (26) and that there is provided a spring-biased locking bar (23) for frictionally locking said conveying drum (1) in the forward pivot position.

12. Loading equipment according to claim 11, characterized in that said pre-tensioned spring (26) is located on an actuating rod (24) having one end thereof hinged to said pivot arm (20), and that said locking bar (23) cooperates with a sloping notch (42) in said actuating rod (24).

13. Loading equipment according to claim 11, characterized in that the cutting blades (16) extending into said conveying channel (15) are pivotally supported and connected to a switch (28) reversing the motor which drives said conveying drum (1).

14. Loading equipment according to claim 9, characterized in that said cutting blades (16) extending into said conveying channel (15) are pivotally supported and connected to said reversing gear (12) via rods.

15. Loading equipment according to claim 8, characterized in that said cutting blades (16) extending into said conveying channel (15) are pivotally supported and connected via rods to said pivot arms (20) of said conveying drum (1).

16. Loading equipment, especially according to claim 1, characterized in that said conveying drum (1) comprises at least two relatively spaced drum discs (64) interconnected to form a rigid unit by rods (65) extending parallel to said drum axis (2), said feed combs (3') being supported on said drum discs (64) so as to be exchangeable in that said drum discs (64) are provided adjacent the peripheries thereof with outwardly open recesses for receiving flanged bearings (67) for supporting the axes of said feed combs (3').

* * * * *